United States Patent [19]
Kiikka et al.

[11] 3,755,683
[45] Aug. 28, 1973

[54] APPARATUS FOR IMPROVING ADHESION OF GELATINOUS AND OTHER COATINGS TO ORIENTED AND UNORIENTED POLYMERIC FILM

[75] Inventors: Lauri W. Kiikka, Victor; Ronald L. Hartman, Rochester, both of N.Y.

[73] Assignee: Eastman Kodak Corporation, Rochester, N.Y.

[22] Filed: Aug. 13, 1971

[21] Appl. No.: 171,656

[52] U.S. Cl.................. 250/542, 204/165, 250/531
[51] Int. Cl. ............................................. C08f 47/22
[58] Field of Search.................... 204/165, 312, 323, 204/328, 164; 250/49.5 TC

[56] References Cited
UNITED STATES PATENTS

| 3,294,971 | 12/1966 | Von Der Heide | 204/312 X |
| 3,308,045 | 3/1967 | Sullivan | 204/312 X |
| 3,376,208 | 4/1968 | Wood | 204/312 X |
| 3,419,489 | 12/1968 | Delaney | 204/312 |

FOREIGN PATENTS OR APPLICATIONS

| 1,334,067 | 6/1963 | France | 250/49.5 TC |
| 925,354 | 5/1963 | Great Britain | 204/312 |

*Primary Examiner*—F. C. Edmundson
*Attorney*—William T. French et al.

[57] ABSTRACT

Excellent adhesion of gelatinous and other coatings to oriented and unoriented polymeric film is achieved under both dry and wet conditions. The polymeric film is transported through an elongated coruscate electrical discharge field generated by a high voltage alternating current source on one side of the polymeric film, and which appears similar to an oxidizing flame. The opposite side of the polymeric film is transported in engagement with a conducting surface causing the electrical discharge field to penetrate the film as it moves through and along the coruscate electrical discharge field. Polymeric film treated by the coruscate electrical discharge field has improved adhesive qualities for use in, among other things, heat sealing operations in which a plastic film is heat sealed to the polymeric film, and photographic coating and subcoating operations in which a photographic emulsion, nucleating layer, actinic radiation-sensitive layer, or the like is coated onto the polymeric film.

6 Claims, 2 Drawing Figures

PATENTED AUG 28 1973

3,755,683

LAURI W. KIIKKA
RONALD L. HARTMAN
INVENTORS

BY Steve W. Grombow

ATTORNEY

APPARATUS FOR IMPROVING ADHESION OF GELATINOUS AND OTHER COATINGS TO ORIENTED AND UNORIENTED POLYMERIC FILM

BACKGROUND OF THE INVENTION

1. Field of the Invention

This invention relates generally to the treatment of web surfaces, and more specifically to treating the surface of oriented and unoriented polymeric film to an elongated coruscate electrical discharge field for achieving excellent adhesion of a photographic emulsion or other coating to the film surface under both dry and wet conditions.

2. Description of the Prior Art

The surface treatment of plastics to render their surface receptive to inks, adhesives, and other coating materials is described in U.S. Pat. No. 3,192,385. This surface treatment involves passing the plastic through a pair of spaced electrodes, one of which is grounded, and supplying the ungrounded electrode with radio frequency voltage. Another method disclosed in U.S. Pat. No. 3,376,208 involves forming an electrical discharge between two electrically conducting electrodes on one side of the film in which the power electrode is in series with a resistor to limit the discharge to a corona discharge, and passing the film surface over an insulated roller and through and along the discharge. The insulated roller in conjunction with the power resistor minimizes penetration of the film surface by the electrical discharge. These methods and other similar methods have come into widespread use for the treatment of polyolefin and unoriented polymeric films such as polyethylene and polyethylene terephthalate in order to increase their adherent qualities, but do not appear to be entirely satisfactory for oriented polymeric film. By oriented film, we mean film that has been stretched in processes known as drafting and tentering in order to give it improved tensile strength and crystallization. In the case of oriented polymeric film such as semi-crystalline polyethylene terephthalate, the surface thereof is more chemically inert after the film has been stretched to obtain the desired biaxial orientation and heat set. The higher degree of crystallization and the higher tensile strength of the film produces a polymeric film surface more difficult to coat with a plastic in a heat sealing operation or with a photographic emulsion or the like and achieve satisfactory adhesion. The emulsion coating utilized in this invention is of the type in which gelatin or polymers (either organic or inorganic) with polar groups is a binder. One solution to treating oriented polymeric film so that coatings such as an emulsion coating will adhere thereto under both dry and wet conditions is in widespread use and involves initially coating the polymeric film base with a subcoating containing polymer, gelatin and solvents or surfactants, and then coating the photographic emulsion on the subcoating. Although satisfactory, this solution has the disadvantage of requiring an additional subcoating operation, and one containing solvents or surfactants which may later interfere with the adhesive bond between the emulsion layer and film support. Another solution is described in U.S. Pat. No. 3,072,483 and involves a flame treating method. However, flame treatment of oriented polymeric film has not come into widespread use, possibly because no known commercial equipment has been or can be developed. In addition, flame treatment is difficult to control, yields non-uniform results, and the possibility of distorting the film with the flame may still exist. Surprisingly, we have discovered that an oriented film having one surface in contact with a metal roller, and its opposite surface subjected to a coruscate electrical discharge field, results in a treated film to which a coating such as a photographic emulsion strongly adheres under both dry and wet conditions without the necessity of using a subcoat first that contains adverse solvents or surfactants that may later interfere with the adhesive bond between the emulsion layer and the film support.

By a coruscate electrical discharge, we mean an electrical discharge that involves intermittent flashes or sparkles that appear to wiggle or travel along many random or varied paths, and are similar in color to a hot oxidizing flame. The flashes appear to be accompanied by glittering along the periphery thereof. This coruscate electrical discharge is considerably different in appearance and result from the aforementioned corona and spark electrical discharge. The corona electrical discharge appears often as a colored circle around and close to a luminous body, such as a faint bluish glow adjacent to the surface of an electrical conductor at high voltage. A spark discharge normally involves a luminous disruptive electrical discharge of very short duration between two conductors.

Although there appear to be some definite visual differences between a coruscate electrical discharge and a corona or spark discharge, the major differences between such electrical discharges is in the results achieved from tests on treated oriented polymeric film. Oriented film treated with a corona or spark electrical discharge does not form a plurality of visual randomly directed tracks which form a permanent haze when swabbed with dichloromethane. In addition, the treated film when wet by distilled water droplets has a high contact angle by the bubble method of around 36°. When the treated film was coated with an emulsion, it was found to possess only some dry and wet adherence to the film when tested by a tape test in which a strip of tape is pressed firmly to the dry emulsion surface and stripped off rapidly, and a firm multiple rub-off test in which the wet emulsion is rubbed firmly after passing through alkaline and acidic processing solutions. On the other hand, the oriented polymeric film such as polyethylene terephthalate when treated by the coruscate electrical discharge was found to contain a plurality of the visual randomly directed lines or tracks on the surface which covered a high percentage but not one hundred percent of the surface, and which did not appear to have any adverse photographic effects on oriented semi-crystalline polyethylene terephthalate. The lines or tracks on the surface gave a positive test result to the application of dichloromethane, and formed a permanent haze believed to be an amorphous fraction of polyethylene terephthalate. The treated film when wet by distilled water droplets had a low contact angle by the bubble method of around 17°. When the treated film was coated with an emulsion and subjected to the tape and firm multiple rub-off tests, the emulsion adhesion to the film was excellent.

SUMMARY OF THE INVENTION

Heretofore, there has been no known electrical method of treating oriented polymeric film such as semi-crystalline polyethylene terephthalate film to achieve adhesion of a photographic emulsion or other coating to the film that is excellent for both dry and wet conditions. This invention includes within its scope an improved method for treating the surface of both oriented and unoriented polymeric film so that excellent adhesion will result for heat treating operations, and for coating operations such as emulsion coatings. This excellent adhesion is accomplished by subjecting the film surface to a coruscate electrical discharge field generated by a high voltage alternating current which appears similar to a hot oxidizing flame. This is preferably accomplished by transporting the polymeric film over a conducting roller in engagement with one surface of the film, and subjecting the opposite surface of the film to the coruscate electrical discharge field extending between two parallel electrodes located on the same side of the film and spaced apart in the direction of the web. The surface of the film passes through and along the discharge field resulting in considerable penetration of the film surface by the glittering discharges by virtue of the conducting roller on the opposite side of the film.

One object of the present invention is to provide an improved method for treating the surface of a film in order to increase the adherent properties and receptivity thereof.

Another object of the invention is to provide an improved method for treating the surface of a film so that a coating such as a photographic emulsion, nucleating layer, or radiation-sensitive layer, or the like may be coated onto or secured to the film with excellent adherence under dry and wet conditions without the addition of a subcoat that contains adverse solvents or surfactants that may later interfere with the adhesive bond between the coating and the film.

Another object of the invention is to achieve excellent dry and wet adhesion of a coating of photographic emulsion, or other sub-coatings, antihalation layers, anti-stat coatings and the like, in which gelatin or polyemers (either organic or inorganic) with polar groups is a binder, to both oriented and unoriented polymeric film without objectionably distorting the film or producing surface defects.

Another object of the invention is to achieve excellent dry and wet adhesion of a plastic layer or a coating of photographic emulsion or the like to both oriented and unoriented polymeric film by transporting the film with one surface in engagement with a conducting roller, and treating the opposite surface to a coruscate electrical discharge field which is similar to an oxidizing flame travelling along one side of the film.

Another object of the invention is to achieve excellent dry and wet adhesion of a plastic layer or a photographic emulsion or other coating to an oriented polymeric film such that the coating cannot be stripped from the film during production, processing and use of the film.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENTS

The film treating apparatus of the invention generally comprises one or more electrically conducting rollers, a pair of spaced apart electrodes spaced from the periphery of each roller, and a polymeric film transported by any suitable means between each roller and corresponding electrodes. The surface of the film adjacent the electrodes is subjected to an electrical discharge field which appears similar to a hot oxidizing flame that is considerably different than a glow, corona or sparking discharge. We have termed this electrical discharge field a coruscate electrical discharge and have described it in considerable detail in the section of this specification entitled "Description of the Prior Art." Although only one roller and pair of electrodes is shown for treating a film in FIG. 1, it is of course possible to have a plurality of such rollers and corresponding electrodes in sequence, each fired by the same or separate power supplies.

Figure 1:
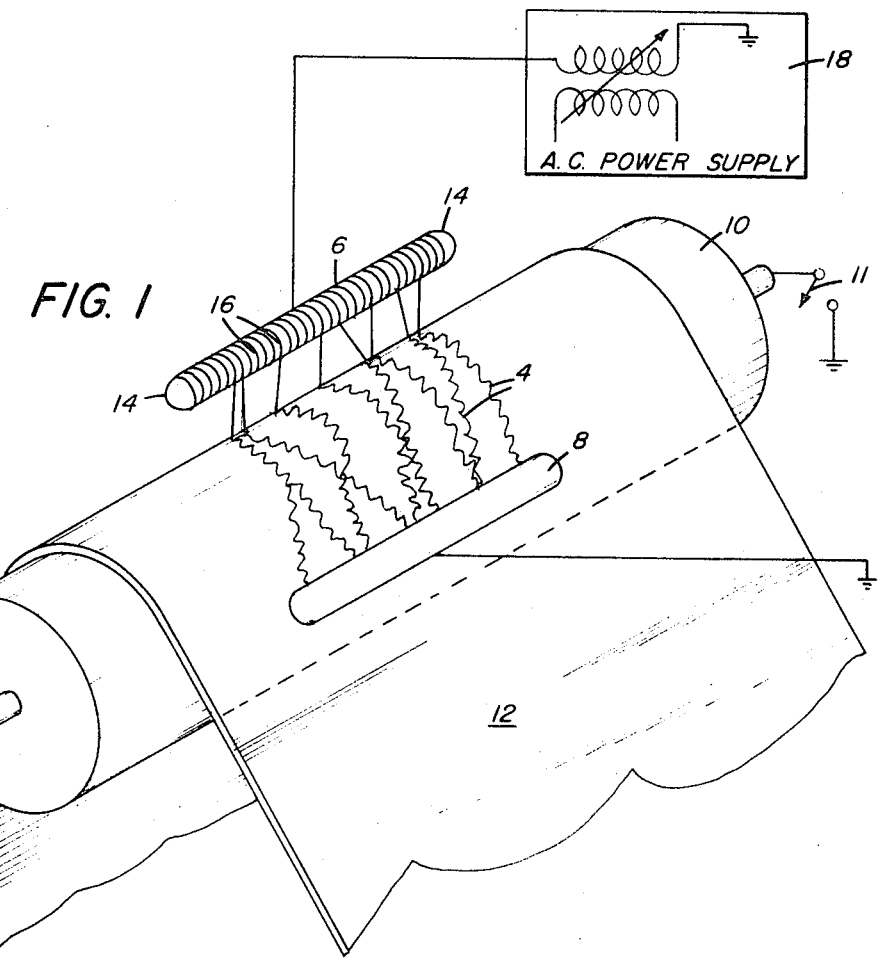
FIG. 1 is a perspective view of a preferred embodiment of an apparatus for carrying out the method of this invention.

In the preferred embodiment of the apparatus illustrated in FIG. 1 of the drawing, the electrical discharge field is illustratively shown as randomly directed zig-zag lines 4 achieved by a pair of parallel, metal rod-like power and ground electrodes 6, 8 respectively. The electrodes are angularly spaced apart approximately 2.5 inches along the periphery of a bare metal ground roller 10 of 3.75 inches diameter, which may or may not be grounded through a switch 11. Each electrode 6, 8 is spaced approximately an eighth of an inch above the surface of a polymeric film 12 transported at a speed of approximately 15 feet per minute. Electrode 8 is grounded and may be cylindrical or have any other suitable configuration. Electrode 6 is a threaded rod of the type generally disclosed in U. S. Pat. No. 3,294,971, but for this application preferably of ⅛ inch diameter, provided with rounded ends 14, and having threads 16 of approximately 32 per inch of length. Electrode 6 is connected to any suitable high voltage, alternating current power supply 18 generating an output of substantially 34 kilovolts at 5 milliamps, 60 Hertz. When the power is connected to electrode 6, intermittent flashes 4 occur from threads 16 of electrode 6 to film 12, and then travel in random fashion across the film surface to ground electrode 8 as partially depicted in FIG. 1. These flashes form random tracks in the film surface which cover a high percentage of the film surface.

Figure 2:
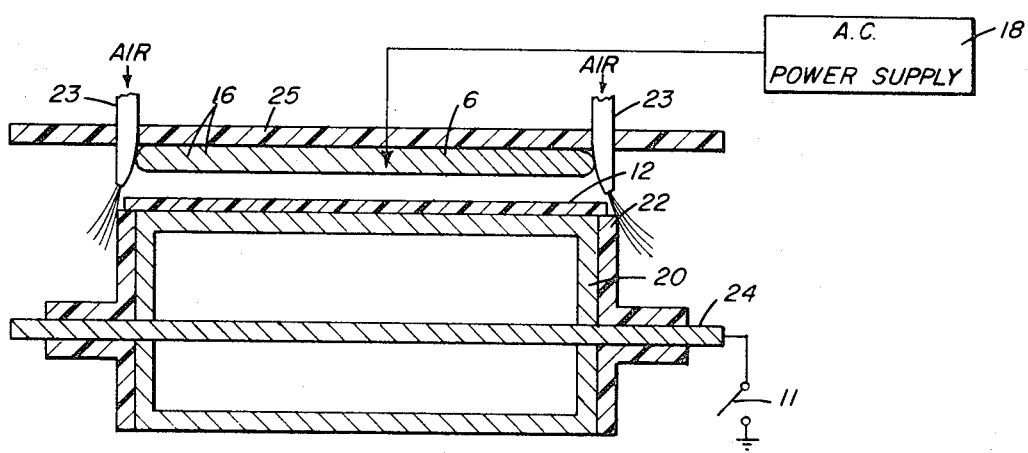
FIG. 2 is a front elevational view in section of a modification of the apparatus of FIG. 1.

It was found that the threaded rod 6 was less likely to produce burn holes than acicular or needle-like projections such as pins, combs or saw blades. Although a threaded rod 6 was used, any equivalent electrode may be used having an arcuate surface of substantially 90° and provided with approximately 32 or more axially spaced knife edges. In the illustration of FIG. 1, the electrodes used were 5 inches long and produced a treated area of approximately 6 inches in width. If the threaded electrode 6 is substantially as wide as the film 12, the electrical power tends to arc over the edges of the film to metal roller 10. Accordingly, in order to treat the film across its entire width, a modified apparatus is provided as shown in FIG. 2 having a metal roller 20 mounted on a metal shaft 24 and provided with dielectric end caps 22 of any suitable electrical insulating material or the equivalent at each end. To further minimize the likelihood of arcing through the interface between the film and outer periphery of end caps 22, dielectric arc knives or nozzles 23 are provided on an electrode support 25 at each end of the roller through which high pressure air is directed across the edges of film 12. The roller and electrodes in each embodiment may be provided with a shroud, not shown, connected to any suitable vacuum source for exhausting any noxious fumes generated by the electrical discharge.

Surprisingly, the electrical discharge field 4 when applied to the surface of an oriented film 12 supported by conducting metal roller 10 alters the oriented semi-crystalline surface of the film in several ways. First, a thin layer of the treated surface shows randomly directed tracks of the coruscate discharge treatment if the treated surface is held at a low angle of illumination. The tracks, which appear necessary to achieve excellent wet and dry emulsion adhesion, and yet do not appear to deleteriously affect the film for photographic purposes, need not cover one hundred percent of the surface to achieve excellent dry and wet adhesion of photographic emulsion coatings or the like. Second, the treated surface gives the same positive test results when swabbed with dichloromethane as an unoriented amorphous polyethylene terephthalate film surface. Such positive test result is the formation of a permanent haze believed to be an amorphous fraction of polyethylene terephthalate, and believed to be a necessary requirement for satisfactory adhesion, particularly dry photographic emulsion adhesion. Third, the treated film surface was found to be readily wet by distilled water droplets and recorded on average contact angle by the bubble method of 17°. Fourth, the dry photographic emulsion adhesion of an emulsion coating applied to the surface was excellent when determined by a tape test in which a strip of tape was pressed firmly to the dry emulsion surface and stripped off rapidly. Also, the wet emulsion adhesion of the coating was excellent when determined by a firm multiple rub off test of the wet emulsion surface with a finger after passing through each alkaline and acidic processing solution. It was surprisingly found that the adherence of a photographic emulsion to an oriented semi-crystalline polyethylene terephthalate film treated by the above-described electrical discharge treating method was excellent under both wet and dry conditions. It was further found in the aformentioned film treating method that if a dielectric is added to electrode 6 or to the peripheral surface of metal roller 10 which is engageable by film 12 that the dry and wet emulsion adhesion to the oriented film was unsatisfactory.

The invention has been described in detail with particular reference to a preferred embodiment thereof, but it will be understood that variations and modifications can be effected within the spirit and scope of the invention as described hereinabove.

I claim:

1. In an apparatus for treating the surface of a polymeric film to improve the dry and wet adherence of a layer or coating to the surface, the combination comprising:

electrically conducting means for supporting one side of the film and having a conducting surface for engagement with said side of said film; and a pair of spaced apart, power and ground electrodes mounted on the opposite side of the film and spaced from the film, said power electrode comprising an elongated member having axially spaced, peripheral, arcuate knife edges and being connected to a high voltage, alternating current power supply, and said ground electrode being connected to ground, said power and ground electrodes generating an elongated electrical dishcarge path between the electrodes which appears similar to an oxidizing flame and which travels along and partially penetrates the film surface.

2. The invention according to claim 1 wherein said elongated member is a threaded rod having approximately 32 threads per inch of length.

3. The invention according to claim 1 wherein said high voltage alternating current power supply generates substantially 34 kilovolts at 5 milliamps, 60 hertz.

4. The invention according to claim 1 wherein said elongated member is a threaded rod having approximately 32 threads per inch of length and further having rounded ends, and said high voltage alternating current power supply generates substantially 34 kilovolts at 5 milliamps, 60 hertz.

5. The invention according to claim 1 wherein said electrically conducting means is provided with a dielectric support surface for supporting each side edge of the film, said apparatus further having air nozzles for directing air under pressure across the edges of the film in engagement with said conducting means.

6. The invention according to claim 1 wherein said electrically conducting means comprises a metal roller provided with dielectric end caps for supporting each side edge of the film, said apparatus further having air nozzles for directing air under pressure across the edges of the film in engagement with said metal roller.

* * * * *